(12) United States Patent
Chen et al.

(10) Patent No.: US 11,989,992 B2
(45) Date of Patent: May 21, 2024

(54) AUTHORITY CONTROL SYSTEM

(71) Applicant: LUXSHARE-ICT CO., LTD., Taipei (TW)

(72) Inventors: Guan-Chi Chen, Taipei (TW); Yen-Chuan Lin, Taipei (TW); Hao-Ying Chang, Taipei (TW)

(73) Assignee: LUXSHARE-ICT CO., LTD., Taipei (TW)

( * ) Notice: Subject to any disclaimer, the term of this patent is extended or adjusted under 35 U.S.C. 154(b) by 583 days.

(21) Appl. No.: 17/078,446

(22) Filed: Oct. 23, 2020

(65) Prior Publication Data

US 2021/0043020 A1 Feb. 11, 2021

(30) Foreign Application Priority Data

Jun. 12, 2020 (TW) .................................. 109119977

(51) Int. Cl.
*G06Q 20/32* (2012.01)
*G06F 21/32* (2013.01)
(Continued)

(52) U.S. Cl.
CPC ............... *G07C 9/37* (2020.01); *G06F 21/32* (2013.01); *G06F 21/35* (2013.01);
(Continued)

(58) Field of Classification Search
CPC ..... H04W 12/06; H04W 12/08; H04W 12/47; H04W 4/00; H04W 12/00; H04W 4/80; H04W 12/068; H04L 63/0861; H04L 9/00; H04L 9/30; H04L 9/32; H04L 63/0853; H04L 2209/805; H04L 63/0428;
(Continued)

(56) References Cited

U.S. PATENT DOCUMENTS 7,178,026 B2 2/2007 Scheidt et al.
10,110,574 B1 10/2018 Ziraknejao
(Continued)

FOREIGN PATENT DOCUMENTS

CN 200904676 B 2/2009
CN 103632401 A 3/2014
(Continued)

*Primary Examiner* — Dionne Pendleton
(74) *Attorney, Agent, or Firm* — Birch, Stewart, Kolasch & Birch, LLP

(57) ABSTRACT

An authority control system includes a biometric identification unit, a near field communication (NFC) signal transmission unit, and an NFC signal receiving unit. The biometric identification unit stores associated data, configured to obtain first biometric data, obtains encoded data according to the first biometric data and the associated data, and transmits the encoded data. The NFC signal transmission unit is configured to receive the encoded data transmitted by the biometric identification unit, and transmit the encoded data by using an NFC transmission technology. The NFC signal receiving unit stores authorization type comparison data. The NFC signal receiving unit is configured to receive the encoded data transmitted by the NFC signal transmission unit, and determines an authorization type according to the encoded data and the authorization type comparison data.

23 Claims, 9 Drawing Sheets

(51) Int. Cl.
*G06F 21/35* (2013.01)
*G06K 7/10* (2006.01)
*G06Q 20/34* (2012.01)
*G06Q 20/36* (2012.01)
*G07C 9/37* (2020.01)
*H04B 5/77* (2024.01)
*H04W 4/80* (2018.01)
*H04W 12/06* (2021.01)
*H04W 12/47* (2021.01)
*G06Q 50/26* (2012.01)

(52) U.S. Cl.
CPC ......... *G06K 7/10316* (2013.01); *G06Q 20/34* (2013.01); *G06Q 20/363* (2013.01); *H04B 5/77* (2024.01); *H04W 4/80* (2018.02); *H04W 12/47* (2021.01); *G06Q 50/265* (2013.01)

(58) Field of Classification Search
CPC ............... H04L 9/3231; H04L 2209/56; H04L 2209/84; H04L 2463/062; H04L 2463/082; H04L 63/0492; H04L 63/06; H04L 63/062; H04L 63/068; H04L 63/083; H04L 63/10; H04L 63/102; H04L 63/105; H04L 63/18; H04L 65/762; H04L 67/02; H04L 67/04; H04L 67/52; H04L 67/53; H04L 67/561; H04L 69/04; H04L 9/008; H04L 9/083; H04L 9/0894; H04L 9/3271; H04B 5/0056; H04B 5/00; H04B 5/77; G07C 9/00563; G07C 9/00896; G07C 9/37; G07C 9/38; G07C 9/00; G07C 9/257; G07C 2009/00547; G07C 2209/02; G07C 9/00182; G07C 9/26; G07C 9/27; G06Q 50/265; G06Q 20/20; G06Q 20/40; G06Q 10/06; G06Q 20/36; G06Q 20/38; G06Q 30/06; G06Q 40/02; G06Q 50/22; G06Q 20/206; G06Q 20/40145; G06Q 20/3674; G06Q 20/208; G06Q 20/3224; G06Q 20/3672; G06Q 20/3676; G06Q 20/382; G06Q 20/3821; G06Q 20/3829; G06Q 20/385; G06Q 20/4012; G06K 7/10316; G06K 7/10; G06K 7/14; G06K 19/06; G06K 7/10297; G06K 7/10366; G06K 7/1417; G06T 5/50; G01C 21/36; G01C 21/362; G06F 21/32; G06F 21/35; G06F 21/62; G06F 21/6245; G06F 18/2163; G06F 21/31; G06F 21/45; G06F 21/6218; G06F 2221/2111; G06F 2221/2113; G06F 2221/2115; G06F 3/03547; G16H 10/60; G07G 1/0009; G07G 1/0045; G06V 10/993; G06V 40/13; G06V 40/1347; G06V 40/1359; G06V 40/1365; G06V 40/1376; G06V 40/166; G06V 40/19; G06V 40/50

See application file for complete search history.

(56) References Cited

U.S. PATENT DOCUMENTS

| | | | |
|---|---|---|---|
| 11,551,200 B1* | 1/2023 | Cook | .................. G06Q 20/204 |
| 2017/0244703 A1* | 8/2017 | Lee | ..................... H04W 12/065 |
| 2019/0340455 A1* | 11/2019 | Jung | ................... G06F 18/2163 |

FOREIGN PATENT DOCUMENTS

| | | |
|---|---|---|
| CN | 201614594 A | 4/2016 |
| CN | 105678873 A | 6/2016 |
| CN | 207367296 U | 5/2018 |
| CN | 110318587 A | 10/2019 |
| CN | 110570557 A | 12/2019 |
| TW | M483988 U | 8/2014 |

\* cited by examiner

AUTHORITY CONTROL SYSTEM

CROSS-REFERENCE TO RELATED APPLICATION

This non-provisional application claims priority under 35 U.S.C. § 119(a) to Patent Application No. 109119977 filed in Taiwan, R.O.C. on Jun. 12, 2020, the entire contents of which are hereby incorporated by reference.

BACKGROUND

Technical Field

This application relates to an authority control system, and in particular, to an authority control system with biometric identification.

Related Art

In modern society, with increasing requirements for security control, opportunities to use an authority control system such as an access control system in a variety of occasions are also increasing, so as to conveniently and efficiently control or grasp the state of personnel in and out.

Some existing access control systems use devices such as access control cards or access control magnetic buckles for sensing and/or reading at a card reader. However, the devices such as the access control cards or the access control magnetic buckles need to be carried around, easily causing inconvenience to users and greatly increasing the possibility of loss. In addition, the access control system cannot determine whether a person swiping a card is a card holder, a person originally authorized to hold an access control card may hand over the access control card or other devices to another person for swiping, which leads to a failure in implementing personnel control, further causing security risks.

SUMMARY

In view of the above, the objective of some embodiments of this application is to provide an authority control system, which is provided with a near field communication (NFC) signal receiving unit using an NFC technology, and is further provided with an NFC signal transmission unit and a biometric identification unit connected to the NFC signal transmission unit. Accordingly, an effect of simulating biometric features of a user as a physical authority identification device (for example, a physical access control card) can be achieved, and an NFC reading device is extended into an authority control system capable of performing biometric identification. In this way, there is no need to use an additional access control card or other similar devices for sensing with the NFC reading device, thereby relieving the inconvenience of carrying the access control card or other devices, and effectively confirming that an authorized person is a preset authorized person.

According to some embodiments, this application provides an authority control system, including a biometric identification unit, configured to generate encoded data; an NFC signal transmission unit, configured to receive the encoded data transmitted by the biometric identification unit, the NFC signal transmission unit including an antenna, and the NFC signal transmission unit being configured to transmit the encoded data through the antenna; and an NFC signal receiving unit. The biometric identification unit includes a first biometric identification module, configured to obtain first biometric data; a first storage module, storing associated data; and a first microcontroller module, connected to the first biometric identification module and the first storage module, the first microcontroller module being configured to receive the first biometric data; obtain the encoded data according to the first biometric data and the associated data; and transmit the encoded data. The NFC signal receiving unit includes a first wireless communication module, configured to receive the encoded data transmitted by the NFC signal transmission unit; a second storage module, storing authorization type comparison data; and a second microcontroller module, connected to the first wireless communication module and the second storage module, configured to receive the encoded data received by the first wireless communication module, and determines an authorization type according to the encoded data and the authorization type comparison data.

According to some embodiments, the authority control system may include a to-be-unlocked unit, the to-be-unlocked unit including a to-be-unlocked item. The NFC signal receiving unit is configured to transmit the authorization type to the to-be-unlocked unit. The to-be-unlocked unit is configured to receive the authorization type transmitted by the NFC signal receiving unit; and perform a corresponding action on the to-be-unlocked item according to the authorization type.

According to some embodiments of this disclosure, the authority control system further includes a to-be-unlocked unit connected to the NFC signal receiving unit. By making the authority control system further includes a to-be-unlocked unit, the NFC signal receiving unit may transmit, according to the authorization type obtained in the NFC signal receiving unit, corresponding information/instructions to the to-be-unlocked unit to make the to-be-unlocked unit produce a corresponding action. Therefore, in some embodiments, the authority control system of this disclosure may also be used as an access control system.

According to some embodiments, the authority control system further includes a control unit, configured to adjust the associated data in the first storage module. The biometric identification unit further includes a fourth wireless communication module, the fourth wireless communication module being connected to the first microcontroller module. The control unit includes a second biometric identification module, configured to obtain second biometric data; a fifth microcontroller module, connected to the second biometric identification module; and a fifth wireless communication module, connected to the fifth microcontroller module. The fifth wireless communication module being configured to establish communication with the fourth wireless communication module. The fifth microcontroller module is configured to receive the second biometric data; generate another piece of associated data according to the second biometric data; and transmit the another piece of associated data to the biometric identification unit through the fifth wireless communication module. The first microcontroller module is configured to receive the another piece of associated data through the fourth wireless communication module; and adjust the associated data in the first storage module according to the another piece of associated data.

According to some embodiments, this disclosure further provides an authority control system, including a control unit, a biometric identification unit, an NFC signal transmission unit, and an NFC signal receiving unit. The control unit includes a fourth storage module, storing associated data; a fifth microcontroller module, being connected to the fourth storage module; and a fifth wireless communication module, being connected to the fifth microcontroller module. The biometric identification unit is configured to transmit encoded data. The biometric identification unit includes a first biometric identification module, configured to obtain first biometric data; a first microcontroller module, connected to the first biometric identification module; and a fourth wireless communication module, connected to the first microcontroller module. The fourth wireless configured to establish communication with the fifth wireless communication module. The first microcontroller module is configured to receive the first biometric data; and transmit, through the fourth wireless communication module, the first biometric data or biometric processing data based on the first biometric data to the control unit. The fifth microcontroller module in the control unit is configured to receive the first biometric data or the biometric processing data; obtain, according to the first biometric data or the biometric processing data and the associated data, the encoded data; and transmit the encoded data to the first microcontroller module. The first microcontroller module is further configured to receive the encoded data transmitted from the control unit; and transmit the encoded data. The NFC signal transmission unit is configured to receive the encoded data transmitted by the biometric identification unit, and the NFC signal transmission unit includes an antenna. The NFC signal is configured to transmit the encoded data through the antenna. The NFC signal receiving unit includes a first wireless communication module, configured to receive the encoded data transmitted by the NFC signal transmission unit; a second storage module, storing authorization type comparison data; and a second microcontroller module, configured to receive the encoded data received by the first wireless communication module. The second microcontroller module determines, according to the encoded data and the authorization type comparison data, an authorization type.

According to some embodiments of this disclosure, the authority control system may further include a control unit capable of wirelessly communicating with the biometric identification unit. Through the control unit, stored data in the biometric identification unit can be remotely adjusted to add, modify, overwrite, or delete the stored data, so that the authority control system can make, according to a situation, adjustment such as add authorized personnel; or the control unit may be used as a data determining or auxiliary determining unit of the biometric identification unit to increase setting flexibility or security of the authority control system.

According to some embodiments, this disclosure further provides an authority control system, including a biometric identification unit, an NFC signal transmission unit, and an NFC signal receiving unit. The biometric identification unit stores associated data, configured to obtain first biometric data, obtain, according to the first biometric data and the associated data, encoded data, and transmit the encoded data. The NFC signal transmission unit is configured to receive the encoded data transmitted by the biometric identification unit, and transmit the encoded data by using an NFC transmission technology. The NFC signal receiving unit stores authorization type comparison data, and the NFC signal receiving unit is configured to receive the encoded data transmitted by the NFC signal transmission unit. The NFC signal receiving unit determines an authorization type according to the encoded data and the authorization type comparison data.

According to some embodiments, this disclosure further provides an authority control system, including a control unit, storing associated data, a biometric identification unit, an NFC signal transmission unit, and an NFC signal receiving unit. The biometric identification unit is configured to obtain first biometric data, and transmit the first biometric data or biometric processing data based on the first biometric data to the control unit. The control unit is configured to receive the first biometric data or the biometric processing data, obtain, according to the first biometric data or the biometric processing data and the associated data, encoded data, and transmit the encoded data to the biometric identification unit.

DETAILED DESCRIPTION

Figure 1:
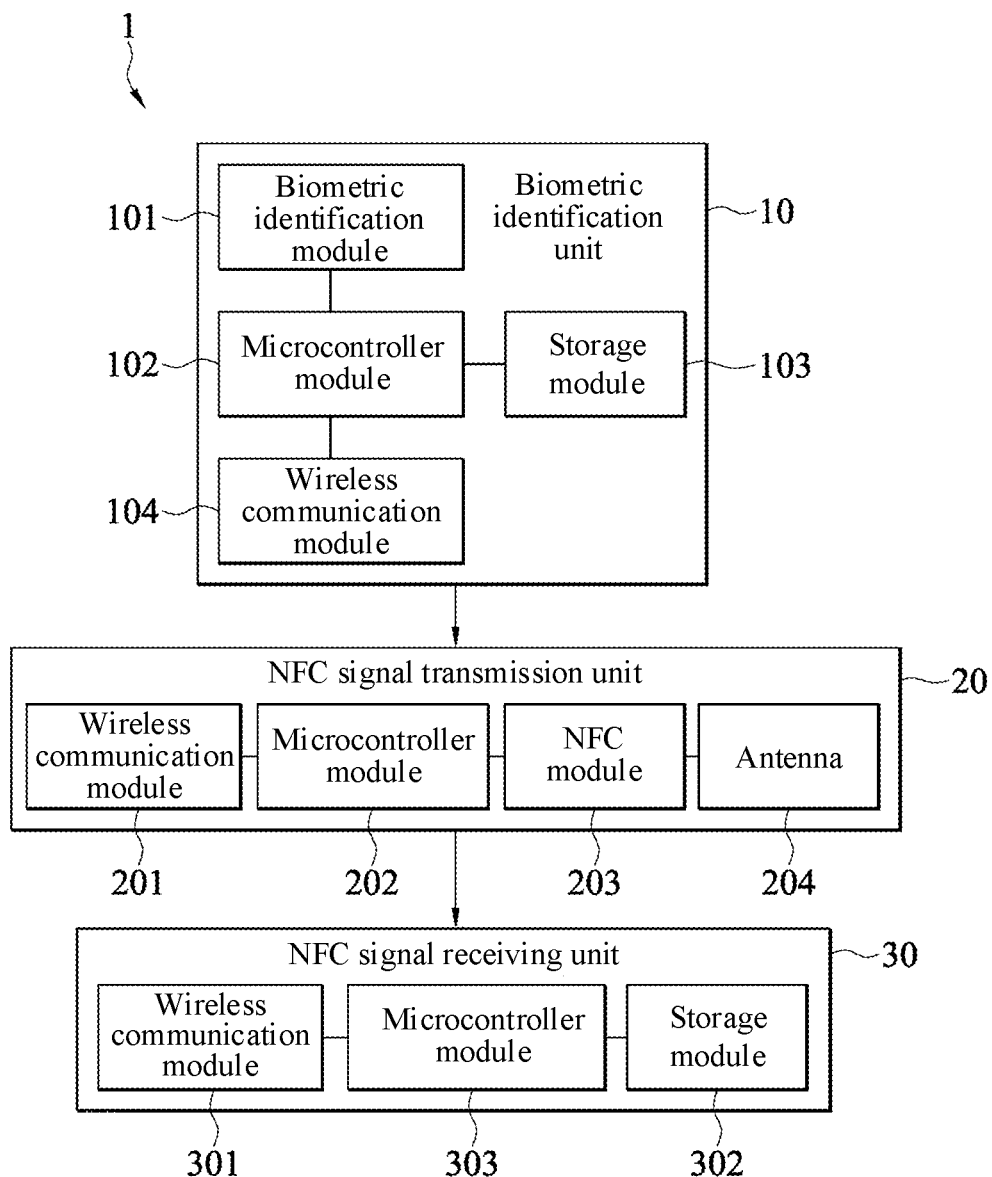
FIG. 1 is a schematic block diagram of an authority control system according to some embodiments of this application.

Refer to FIG. 1. FIG. 1 is a schematic block diagram of an authority control system 1 according to some embodiments of this disclosure. In some embodiments, the authority control system 1 includes a biometric identification unit 10, an NFC signal transmission unit 20, and an NFC signal receiving unit 30. The biometric identification unit 10 may be configured to obtain biometric data of a user, obtain corresponding encoded data according to the biometric data, and then transmit the encoded data to the NFC signal transmission unit 20. The NFC signal transmission unit 20 receives the encoded data transmitted by the biometric identification unit 10, and transmits the encoded data to the NFC signal receiving unit 30 by using an NFC transmission technology. The NFC signal receiving unit 30 may receive the encoded data transmitted by the NFC signal transmission unit 20, and then determine an authorization type according to the encoded data. Accordingly, on the basis of an NFC signal receiving unit, the authority control system is further provided with an NFC signal transmission unit and a biometric identification unit that may transmit encoded data to the NFC signal transmission unit. An NFC reading device can be extended, with a relatively simple configuration, into an authority control system capable of performing biometric identification. Further description is provided below according to the units. It should be understood that for simplicity, power modules (which may be, for example, batteries or external power sources) configured to supply power in the units are omitted and not shown in the figures, and may be set by a person skilled in the art according to requirements.

Still refer to FIG. 1. In some embodiments, the biometric identification unit 10 includes a biometric identification module 101, a microcontroller module 102, and a storage module 103. The biometric identification module 101 and the storage module 103 are connected to the microcontroller module 102 respectively. The biometric identification module 101 may obtain biometric data according to biometric features specific to a user. The biometric features may be, but not limited to, features specific to organisms such as human faces, voiceprints, fingerprints, veins, irises and any organisms that used for identifying individuals. For example, if a human face is used as a to-be-identified biometric feature, the biometric identification module 101 may include a shooting device, configured to shoot the human face, and obtain a two-dimensional human face image or obtain, by scanning the human face, three-dimensional position data as biometric data. In some embodiments, the biometric identification module 101 may be manually started, or be automatically started, by including a human body sensor (for example, a passive infrared sensor (PIR)) in response to an approach by a user.

Figure 2:
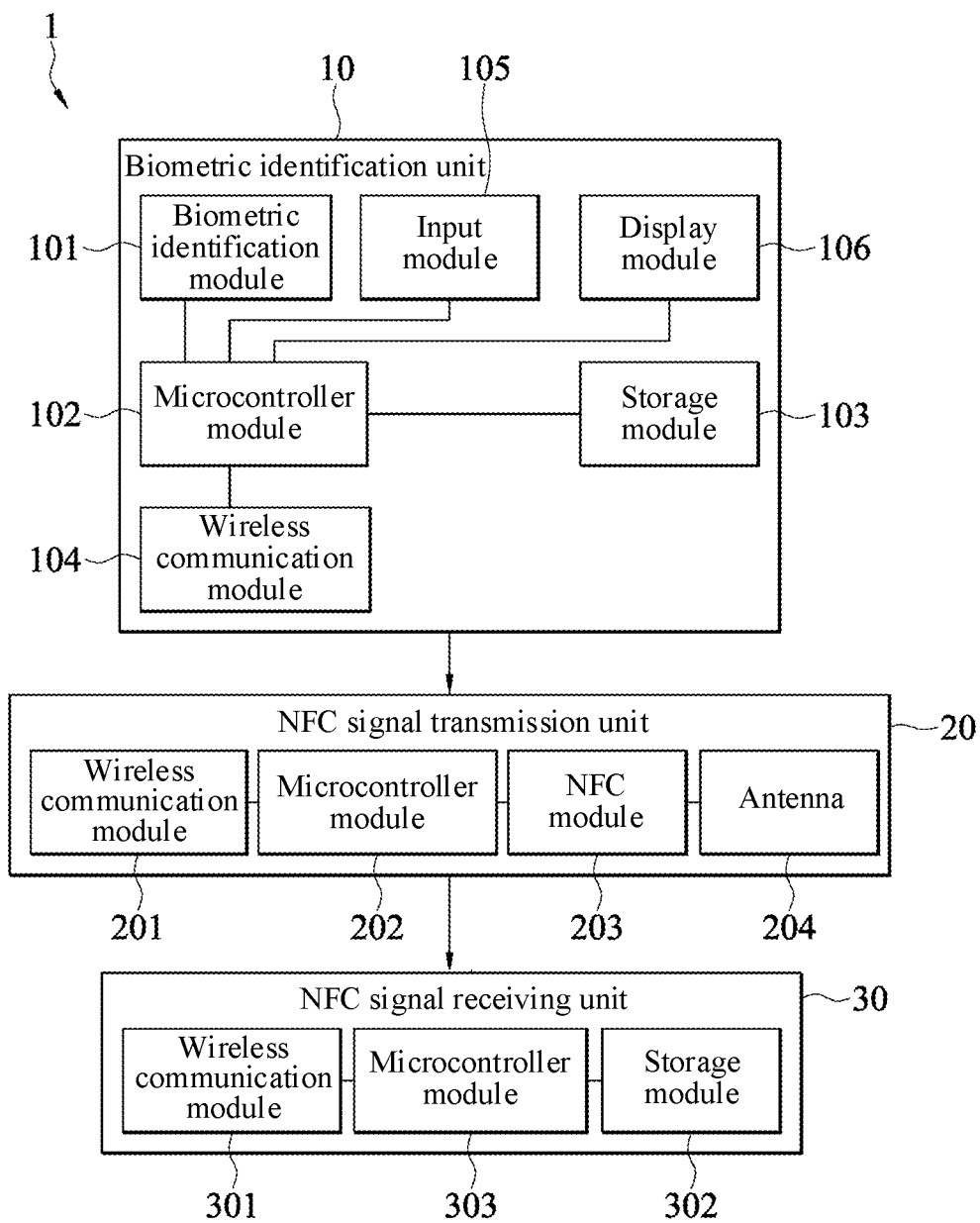
FIG. 2 is a schematic block diagram of an authority control system according to some embodiments of this application.

Refer to FIG. 2. In some embodiments, the biometric identification unit 10 may further includes an input module 105 and/or a display module 106, connected to the microcontroller module 102 respectively. The input module 105 is configured to control the biometric identification module 101 and/or other modules or units, for example, configured to start/close the biometric identification module 101, input information or instructions, and the like. The input module 105 may be a physical interface, for example, a touch panel, a keyboard, or other keys; or may be a virtual interface, for example, a gesture detection or projection input interface, or the like. The display module 106 may be configured to display related information such as an device state or an operation instruction prompt. The display module 106 may be a liquid crystal display device, a light-emitting diode display device, or any other suitable devices that may be configured for displaying. In some embodiments, the input module 105 and the display module 106 may be the same device, for example, may be touch display devices, and are simultaneously configured to display, for example, an operation interface, and configured to input related operation instructions.

Refer to FIG. 1 again. In some embodiments, the microcontroller module 102 is configured to receive the biometric data generated by the biometric identification module 101, and obtain encoded data according to the biometric data. In some embodiments, the encoded data refers to numbers that are not repeated and may be used for identification. For example, in some embodiments, the microcontroller module 102 receives two-dimensional human face image data transmitted by the biometric identification module 101, and the storage module 103 stores associated data, for example, a comparison table of associated data between two-dimensional human face image data and identification numbers (for example, access control card numbers). The microcontroller module 102 may obtain, according to the received biometric data (which is two-dimensional human face image data in these embodiments) and the associated data (which is a comparison table of associated data between the two-dimensional human face image data and the identification numbers in the embodiments) stored in the storage module 103, a corresponding identification number (which is an access control card number in the embodiments) as encoded data to be outputted.

In some other embodiments, after the microcontroller module 102 receives the biometric data transmitted by the biometric identification module 101, the step of obtaining, by the microcontroller module 102, the encoded data according to the biometric data and the associated data may include processing the received biometric data (for example, simplifying the received biometric data, such as only capturing image data of some feature position regions in a two-dimensional human face image) to obtain biometric processing data based on the received biometric data. In these embodiments, the associated data stored in the storage module 103 may be a comparison table of associated data between biometric processing data and identification numbers. Therefore, the microcontroller module 102 may obtain, according to the biometric processing data and the associated data stored in the storage module 103, a corresponding identification number (which is an access control card number in these embodiments) as encoded data to be outputted.

In some embodiments, the data size of the biometric processing data is less than that of the biometric data, so that the microcontroller module 102 may reduce consumed computing resources when obtaining the encoded data, and effectively reduce the complexity and the data size of the associated data in the storage module 103. However, during the processing, first, the biometric data may be complicated as required or the data amount included in the biometric data may be increased, and then the biometric data is simplified.

The microcontroller module 102 may be a digital signal processor, a microcomputer, a system-on-chip, a central processing unit, a field programmable gate array, a programmable logic device, a state machine, a logic circuit, an analog circuit, a digital circuit and/or any device that operates a signal (analog and/or digital) based on an operation instruction. The storage module 103 may be a hard disk, a portable disk, a memory card, a solid state disk, a rewritable non-volatile memory, or other devices that may be configured for storage. The microcontroller module and the storage module in this disclosure may be of a structure the same as that of the microcontroller module 102 and the storage module 103, and the descriptions thereof are omitted later, but it does not limit the microcontroller module and the storage module in this disclosure to be of the same structure.

Still refer to FIG. 1. In some embodiments, the biometric identification unit 10 may include a wireless communication module 104 connected to the microcontroller module 102, and the NFC signal transmission unit 20 includes a wireless communication module 201. The wireless communication module 104 may be configured to establish wireless communication with the wireless communication module 201, and the microcontroller module 102 is configured to transmit the obtained encoded data to the wireless communication module 201 through the wireless communication module 104, so that the biometric identification unit 10 can transmit the encoded data to the NFC signal transmission unit 20 by means of wireless communication. In some embodiments, the wireless communication module 104 and the wireless communication module 201 may be Wireless Fidelity (Wi-Fi), Worldwide Interoperability for Microwave Access (WiMAX), Bluetooth, NFC, High Performance Radio Metropolitan Area Network (HiperMAN), Infrared (IR), Zigbee, Radio Frequency (RF), and the like.

In some embodiments, the wireless communication module 104 and the wireless communication module 201 may be a Bluetooth Low Energy (BLE) module, so that the biometric identification unit 10 and the NFC signal transmission unit 20 have a relatively low power consumption. When the NFC signal transmission unit 20 uses a battery as a power supply source, the standby time of the NFC signal transmission unit 20 may be effectively prolonged and the frequency of battery replacement may be greatly reduced. In addition, because the biometric identification unit 10 and the NFC signal transmission unit 20 perform transmission by means of wireless communication, the overall setting may be more flexible to meet more diverse setting requirements.

Still refer to FIG. 1. In some embodiments, the NFC signal transmission unit 20 is configured to receive the encoded data transmitted by the biometric identification unit 10, and transmit the encoded data to the NFC signal receiving unit 30 by using an NFC transmission technology. In some embodiments, for example, when the associated data stored in the storage module 103 is a comparison table of associated data between biometric data and access control card numbers and the encoded data obtained by the microcontroller module 102 according to the associated data is an access control card number, it may be regarded that the encoded data (the access control card number) transmitted by the biometric identification unit 10 is simulated as a physical access control card through the NFC signal transmission unit 20. The part in which the NFC signal transmission unit 20 transmits the encoded data to the NFC signal receiving unit 30 by using an NFC transmission technology may be regarded as a process in which the physical access control card is sensed with the NFC signal receiving unit 30 and the encoded data (for example, the access control card number) is transmitted to the NFC signal receiving unit 30.

In some embodiments, as shown in FIG. 1, the NFC signal transmission unit 20 includes a microcontroller module 202 connected to the wireless communication module 201, an NFC module 203 connected to the microcontroller module 202, and an antenna 204 connected to the NFC module 203. The microcontroller module 202 is configured to receive, through the wireless communication module 201, the encoded data transmitted by the biometric identification unit 10, transmit the encoded data to the NFC module 203, and control the NFC module 203 to transmit the encoded data to the NFC signal receiving unit 30 through the antenna 204 by means of NFC transmission.

The structure of the microcontroller module 202 in the NFC signal transmission 20 may be selected as that for the microcontroller module 102, and therefore the descriptions thereof are omitted herein. The antenna 204 may be any suitable antenna or other suitable transceiver circuits that implement transmission from the NFC signal transmission unit 20 to the NFC signal receiving unit 30. Therefore, the antenna 204 (for example, a loopback antenna) may be configured to achieve a contactless communication capability of the NFC signal transmission unit 20.

In some embodiments, the antenna 204 is disposed on the NFC signal receiving unit 30 (which may be in direct contact or not in contact with the NFC signal receiving unit 30) to make a smaller distance between the antenna 204 and the NFC signal receiving unit 30, which is conducive to establishment of stable communication between the antenna 204 and the NFC signal receiving unit 30. In some embodiments, when the antenna 204 is disposed on the NFC signal receiving unit 30, the NFC signal receiving unit 30 may be further configured to be started when or after the biometric identification unit 10 is started (for example, after the microcontroller module 102 obtains the encoded data). In this way, a failure of a coil directly mounted above the NFC signal receiving unit 30 (for example, the antenna 204) or a device connected to the coil due to long-time coupling caused by continuous transmission of RF signals from an NFC reading unit (for example, the NFC signal receiving unit 30) can be avoided.

Still refer to FIG. 1. In some embodiments, the NFC signal receiving unit 30 may include a wireless communication module 301, a storage module 302, and a microcontroller module 303. The wireless communication module 301 and the storage module 302 are connected to the microcontroller module 303 respectively. The wireless communication module 301 is configured to receive the encoded data transmitted through the antenna 204 in the NFC signal transmission unit 20. In some embodiments, when the antenna 204 is disposed on the NFC signal receiving unit 30 as described above, the antenna 204 may be disposed on the wireless communication module 301 in the NFC signal receiving unit 30 to provide better communication. For example, in some embodiments, the maximum vertical distance between the antenna 204 and the wireless communication module 301 does not exceed 5 cm. Because the NFC signal receiving unit 30 and the NFC signal transmission unit 20 communicate with each other by using an NFC transmission technology, the wireless communication module 301 is an NFC communication module.

The storage module 302 in the NFC signal receiving unit 30 may include authorization type comparison data. In some embodiments, the authorization type comparison data includes a comparison table of encoded data and authorization types. For example, the encoded data may be access control card numbers, and the authorization types may include "unauthorized" and "authorized". An access control card number in the authorization type comparison data may correspond to "unauthorized" or "authorized". The microcontroller module 303 receives, through the wireless communication module 301, the encoded data transmitted by the NFC signal transmission unit 20, and determines an authorization type according to the encoded data and the authorization type comparison data in the storage module 302. For example, if the authorization type comparison data is a comparison table of "unauthorized" and "authorized", the microcontroller module 303 may determine, according to a received access control card number and the authorization type comparison data, an authorization type of the access control card number as "unauthorized" or "authorized". Accordingly, through the biometric identification unit 10, the NFC signal transmission unit 20, and the NFC signal receiving unit 30 in the authority control system 1, an NFC reading device can be extended, with a relatively simple configuration, into an authority control system capable of performing biometric identification. The biometric features of a user may be sensed with the NFC reading device, an authorization type is determined by the NFC reading device, and an additional device such as an access control card does not need to be used. Therefore, an effect similar to simulation of an access control card with biometric features can be achieved in some embodiments.

In some embodiments, the authorization type of the authorization type comparison data in the storage module 302 may include other data for further setting the authorization type. For example, in combination with time interval data, a corresponding authorization type of a certain access control card number in a certain time period may be "authorized" and a corresponding authorization type thereof in some time periods may be "unauthorized". The authorization type may also be added. For example, the authorization type may include "authorization category 1", "authorization category 2", "authorization category 3", and so on. For example, the authorization type may include classification manners such as "personnel who is qualified and can be authorized", "personnel who is qualified but cannot be authorized" (for example, only patrol personnel is provided for clock in and clock out but cannot access or use a to-be-unlocked device), and "unauthorized".

In some embodiments, the authorization type comparison data may include action instructions corresponding to authorization types. For example, in some embodiments, if the authorization type includes "authorized" and "unauthorized", the authorization type "authorized" may correspond to an action instruction "unlock," and the authorization type "unauthorized" may correspond to an action instruction "not unlock" or "no action." The part is also further described later.

Figure 3:
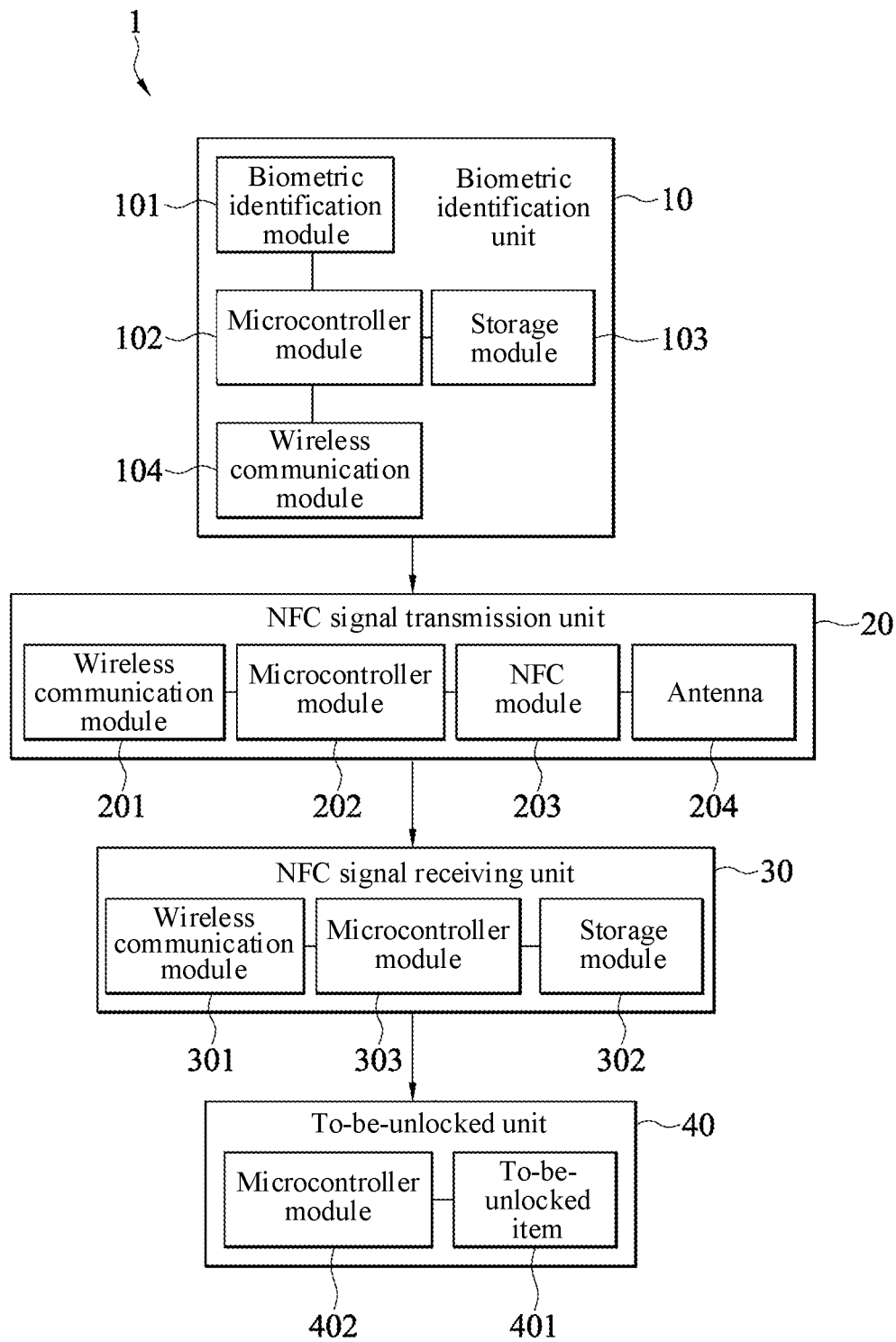
FIG. 3 is a schematic block diagram of an authority control system according to some embodiments of this application.

Next, refer to FIG. 3. In some embodiments, the authority control system 1 may include a to-be-unlocked unit 40. The to-be-unlocked unit 40 includes a to-be-unlocked item 401, and a microcontroller module 402 connected to the to-be-unlocked item 401. In these embodiments, the NFC signal receiving unit 30 transmits the determined authorization type to the to-be-unlocked unit 40 in a suitable manner, and the microcontroller module 402 in the to-be-unlocked unit 40 receives the authorization type transmitted by the NFC signal receiving unit 30 and performs a corresponding action on the to-be-unlocked item according to the authorization type. Accordingly, the authority control system 1 may be further extended from a system for determining authorization to a system of controlling various to-be-unlocked items.

The to-be-unlocked item 401 may be a door or door lock for regulating an entrance or exit of an area, a lock of a locked appliance or device, a floor panel of an elevator, or any other devices that need to be authorized to control whether a user can use the devices and/or how the user can use the devices.

In some embodiments, as described above, the authorization type comparison data may include an action instruction corresponding to the authorization type. In these embodiments, the microcontroller module 303 in the NFC signal receiving unit 30 transmits the determined authorization type and the corresponding action instruction included in the authorization type to the to-be-unlocked unit 40. The microcontroller module 402 in the to-be-unlocked unit 40 receives the authorization type and the action instruction included in the authorization type, and performs a corresponding action on the to-be-unlocked item 401 according to the corresponding action instruction. For example, when the to-be-unlocked item 401 is a door lock for an entrance or exit and the authorization type includes "authorized" and "unauthorized", the authorization type comparison data may include an "unlock" action instruction corresponding to the authorization type "authorized" and a "not unlock" or "no action" action instruction corresponding to the authorization type "unauthorized". In this case, if the authorization type determined by the NFC signal receiving unit 30 is "authorized", the NFC signal receiving unit 30 may transmit the authorization type "authorized" and the corresponding "unlock" action instruction included therein to the to-be-unlocked unit 40. The microcontroller module 402 in the to-be-unlocked unit 40 receives the authorization type and the corresponding action instruction included therein, and performs a corresponding unlock action on the door lock for the entrance or exit according to the corresponding action instruction "unlock."

In some embodiments, because a correspondence exists between authorization types and action instructions, the NFC signal receiving unit 30 may transmit only an action instruction corresponding to the authorization type to the to-be-unlocked unit 40, which is deemed to transmit the authorization type to the to-be-unlocked unit 40.

Figure 4:
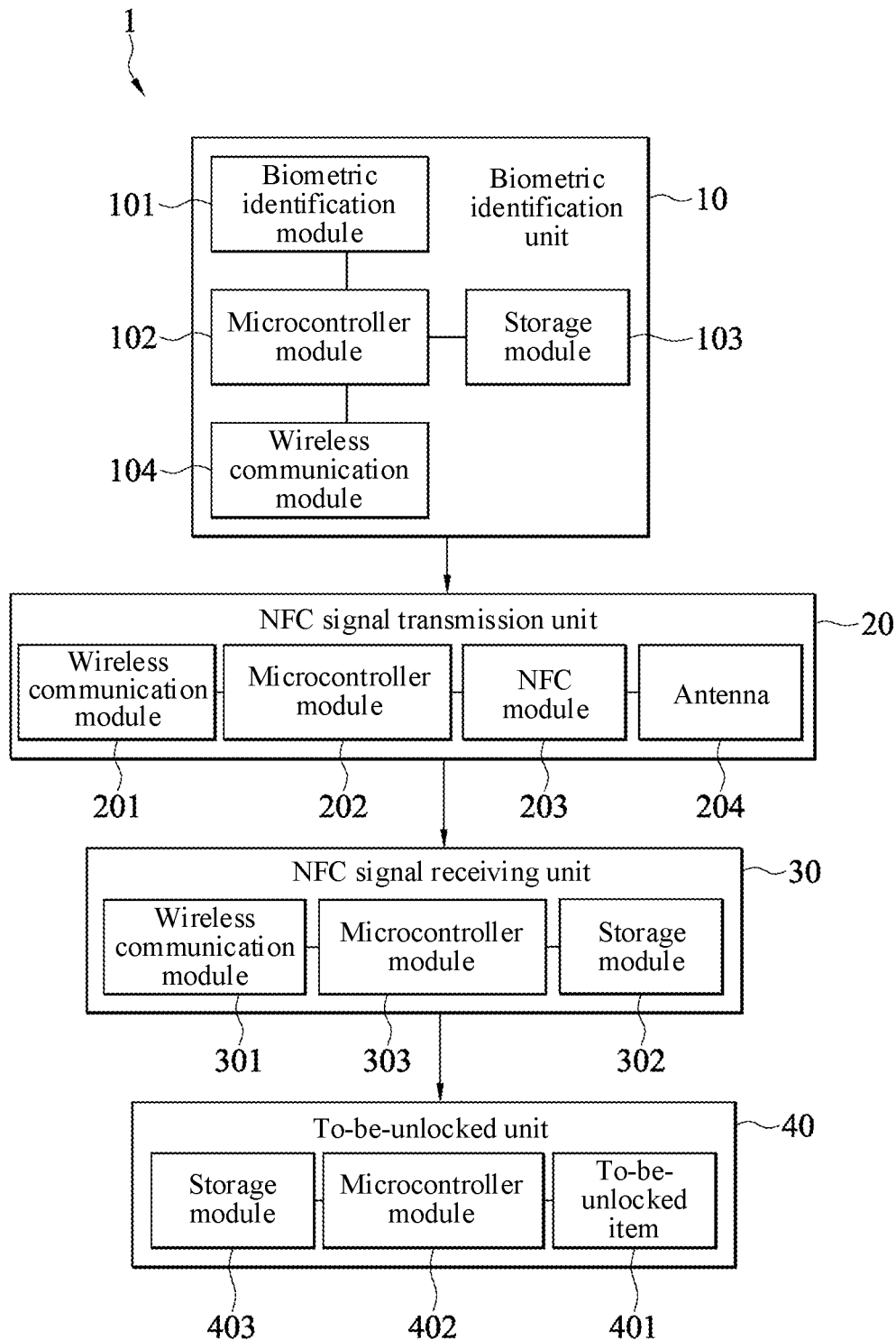
FIG. 4 is a schematic block diagram of an authority control system according to some embodiments of this application.

Next, refer to FIG. 4. In some embodiments, the to-be-unlocked unit 40 may include a storage module 403 connected to the microcontroller module 402. The storage module 403 stores authorization action comparison data. The authorization action comparison data may include a comparison table of authorization types and action instructions. In this case, the NFC signal receiving unit 30 may not need to transmit any action instruction to the to-be-unlocked unit 40. Regarding the authorization action comparison data, for example, when the to-be-unlocked item 401 is a door lock for an entrance or exit and the authorization type includes "authorized" and "unauthorized", the authorization type "authorized" in the authorization action comparison data may correspond to an "unlock" action instruction and the authorization type "unauthorized" may correspond to a "not unlock" or "no action" action instruction. Alternatively, in some other embodiments, when the to-be-unlocked item 401 is a floor panel of an elevator and the authorization type includes "authorization type 1," "authorization type 2," and "unauthorized", "authorization type 1" in the authorization action comparison data may correspond to an action instruction of "open operations of buttons for floors 1 to 5", "authorization type 2" may correspond to an action instruction of "open operations of buttons for floors 1 to 10", and "unauthorized" may correspond to action instruction of a "not open operation". Accordingly, after receiving the authorization type transmitted by the NFC signal receiving unit 30, the microcontroller module 402 obtains, according to the authorization type and the authorization action comparison data, an action instruction to be performed based on the authorization type, and then performs an action corresponding to the action instruction on the to-be-unlocked item 401.

Figure 5:
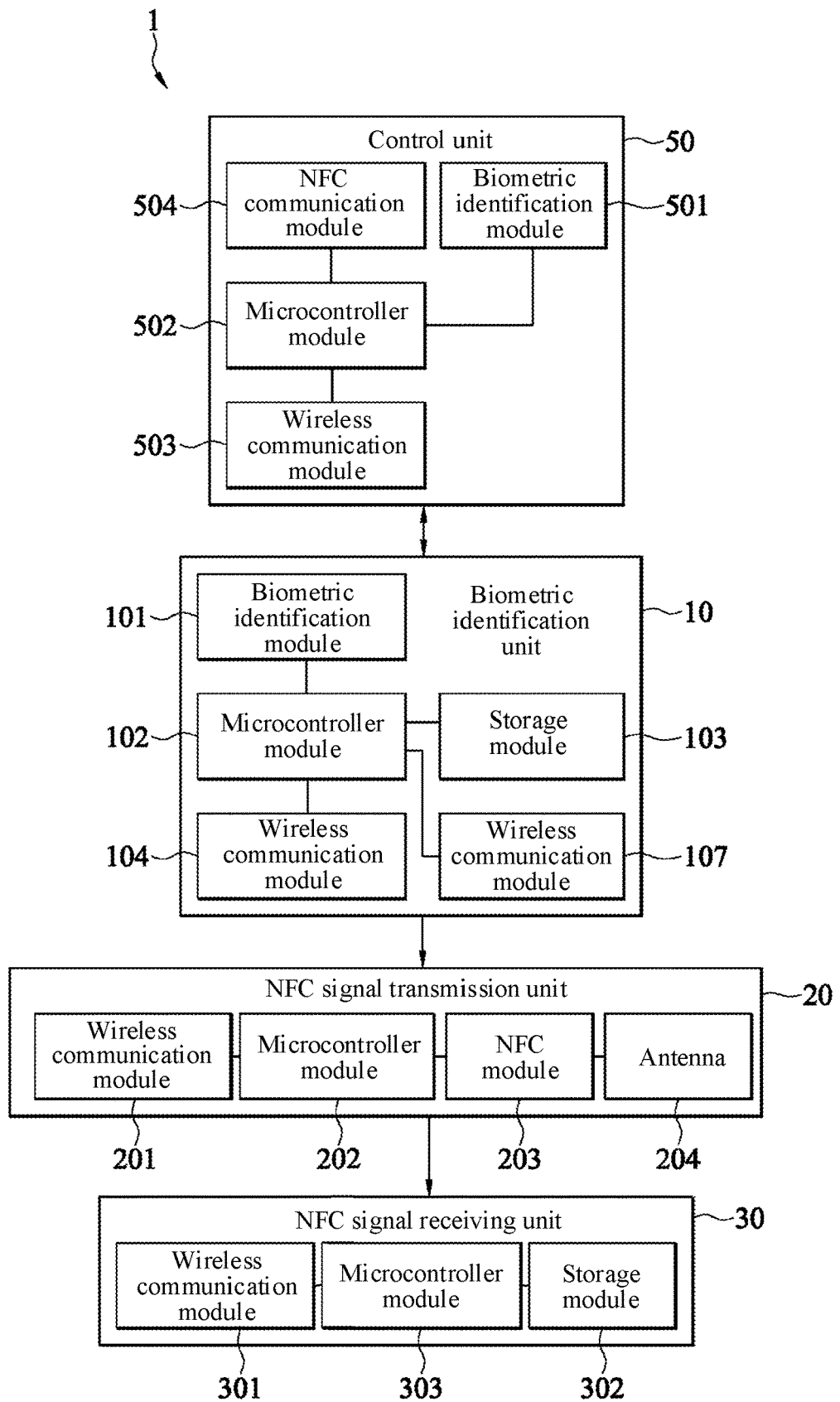
FIG. 5 is a schematic block diagram of an authority control system according to some embodiments of this application.

Next, refer to FIG. 5. In some embodiments, compared with the authority control system 1 shown in FIG. 1, the authority control system 1 shown in FIG. 5 may further include a control unit 50, configured to adjust the associated data stored in the storage module 103 in the biometric identification unit 10. In some embodiments, the control unit 50 includes a biometric identification module 501, a microcontroller module 502 connected to the biometric identification module 501, and a wireless communication module 503 connected to the microcontroller module 502. The biometric identification unit 10 may include a wireless communication module 107 connected to the microcontroller module 102 and configured to establish communication with the wireless communication module 503.

The biometric identification module 501 and the biometric identification module 101 are configured to detect the same type of biometric features and obtain biometric data in the same manner. To make the following description clearer, the biometric data obtained by the biometric identification module 101 is referred to as first biometric data; and the biometric data obtained by the biometric identification module 501 is referred to as second biometric data.

The microcontroller module 502 receives the second biometric data, and generates another piece of associated data according to the second biometric data. The manner of processing the second biometric data by the microcontroller module 502 is the same as the manner of processing the first biometric data by the microcontroller module 102. For example, if the microcontroller module 102 performs additional processing (simplification as described above) on the first biometric data, the microcontroller module 502 also performs the same additional processing on the second biometric data, so that the biometric data generated in the same manner by the biometric identification unit 10 and the control unit 50.

In some embodiments, when encoded data to be linked is known (for example, the encoded data to be linked is a known access control card number), "the microcontroller module 502 generates another piece of associated data according to the second biometric data" may indicate that the encoded data to be linked (the known access control card number herein) is provided for the microcontroller module 502 by means of manual input and then the microcontroller module 502 associates the second biometric data with the encoded data to be linked to generate the another piece of associated data.

As described above, the wireless communication module 503 in the control unit 50 is configured to establish communication with the wireless communication module 107 in the biometric identification unit 10, and the microcontroller module 502 may transmit the another piece of associated data to the biometric identification unit 10 through the wireless communication module 503. The microcontroller module 102 in the biometric identification unit 10 receives the another piece of associated data through the wireless communication module 107, and adjusts the associated data stored in the storage module 103 according to the another piece of associated data. The adjusting of the associated data stored in the storage module 103 may include adding, modifying, overwriting, or deleting the associated data in the storage module 103. For example, in some embodiments, the microcontroller module 102 adds, according to the received another piece of associated data (which is generated by the control unit 50 and may include an access control card number and the second biometric data), one piece of data to the associated data in the storage module 103, overwrites/modifies data with the same access control card number, or deletes the data in the associated data that is the same as the data in the another piece of associated data. Accordingly, the control unit 50 may control the associated data of the biometric identification unit 10.

In some embodiments, the wireless communication module 503 in the control unit 50 and the wireless communication module 107 in the biometric identification unit 10 are both Wi-Fi wireless modules. The Wi-Fi wireless modules can also rapidly transmit information with a large data amount such as biometric data over a long distance due to the better transmission rate and transmission range of the Wi-Fi wireless modules.

Still refer to FIG. 5. In some embodiments, the control unit 50 may include an NFC communication module 504 connected to the microcontroller module 502 and configured to obtain another piece of encoded data. The NFC communication module 504 uses the same reading manner to obtain the same type of data as the wireless communication module 301 in the NFC signal receiving unit 30. For example, the wireless communication module 301 in the NFC signal receiving unit 30 senses and reads the encoded data (for example, the access control card number) transmitted by the NFC signal transmission unit 20; and the NFC communication module 504 in the control unit 50 is a readable physical authority identification device (for example, a physical access control card) and obtains another piece of encoded data (the card number of the physical access control card). When the control unit 50 includes an NFC communication module 504, a user only needs to carry a physical authority identification device (for example, a physical access control card) readable to the NFC signal receiving unit 30 without knowing encoded data (for example, an access control card number) to be linked by biometric features in advance, and the microcontroller module 502 may generate, according to the another piece of encoded data obtained from the NFC communication module 504 and the second biometric data received from the biometric identification module 501, the another piece of associated data. Then, the another piece of associated data is transmitted to the biometric identification unit 10 through the wireless communication module 503 in the control unit 50. Accordingly, the setting of associating a physical authority identification device (for example, a physical access control card) with biometric features of a user can be completed in the control unit 50, and a function of adjusting associated data in the biometric identification unit 10 through the control unit 50 is achieved.

Figure 6:
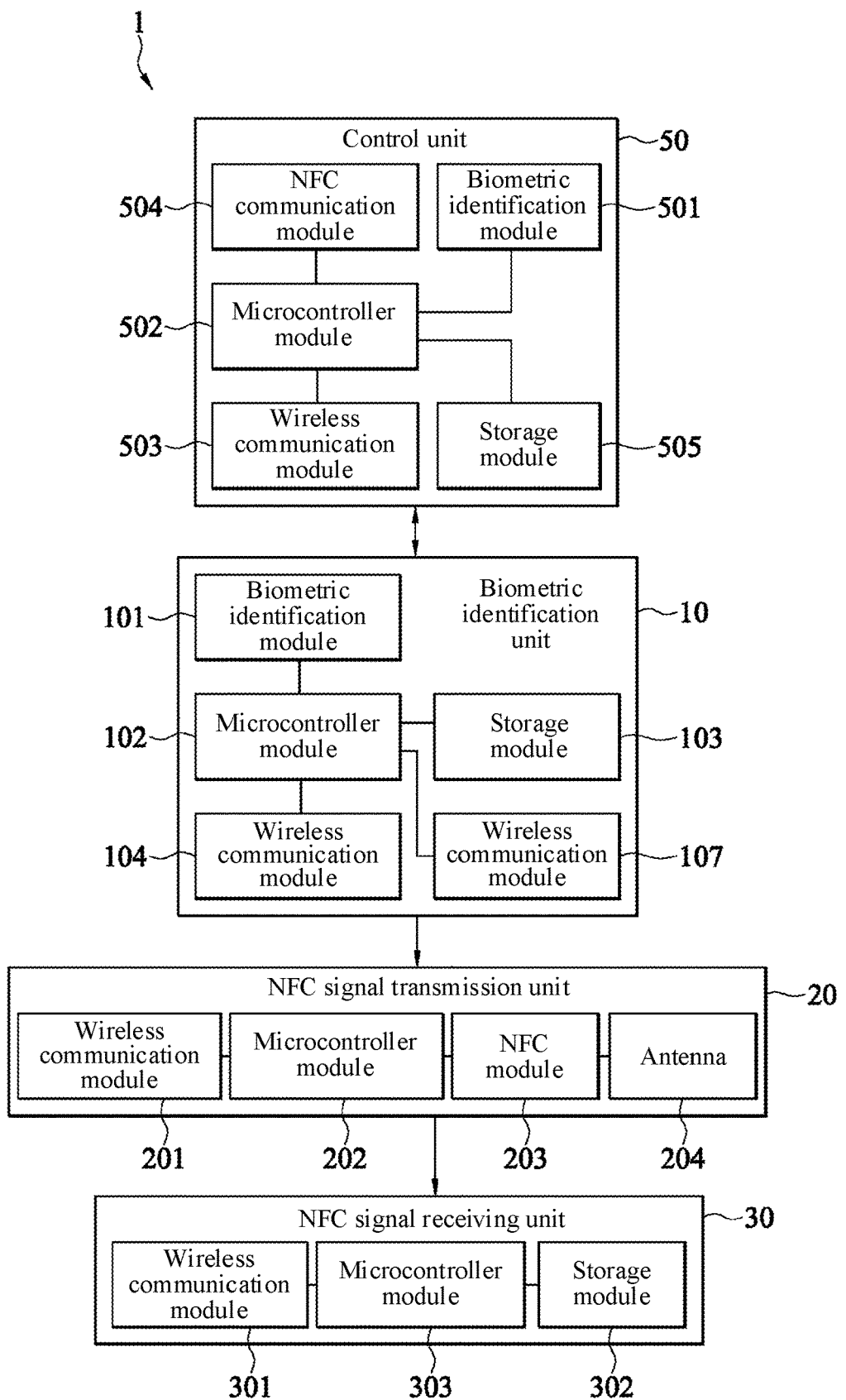
FIG. 6 is a schematic block diagram of an authority control system according to some embodiments of this application.

Next, refer to FIG. 6. In some embodiments, the control unit 50 may include a storage module 505 connected to the microcontroller module 502. The storage module 505 may be configured to store the another piece of associated data generated by the microcontroller module 502. The microcontroller module 502 of the control unit 50 stores the another piece of associated data into the storage module 505 and the microcontroller module 502 transmits the another piece of associated data to the biometric identification unit 10, the order of which is not specifically limited. For example, the microcontroller module 502 of the control unit 50 may store the another piece of associated data into the storage module 505 while transmitting the another piece of associated data to the biometric identification unit 10; or the microcontroller module 502 may store the another piece of associated data into the storage module 505 after transmitting the another piece of associated data to the biometric identification unit 10. In some other embodiments, the microcontroller module 502 of the control unit 50 may first store the another piece of associated data into the storage module 505, and then transmit the another piece of associated data stored in the storage module 505 to the biometric identification unit 10. In some embodiments, the control unit 50 may first store other pieces of associated data generated by the microcontroller module 502 into the storage module 505, and then transmit the other pieces of associated data together to the biometric identification unit 10.

In some embodiments, the storage module 505 in the control unit 50 may first store the associated data in the storage module 103 of the biometric identification unit 10, and then store another piece of associated data generated by the microcontroller module 502. In some embodiments, the another piece of associated data generated by the microcontroller module 502 may be simply stored in the storage module 505; while in some other embodiments, the microcontroller module 502 of the control unit 50 is configured to adjust, according to the another piece of associated data generated by the microcontroller module 502, associated data originally stored in the storage module 505. The manner in which the microcontroller module 502 adjusts the associated data in the storage module 505 according to the another piece of associated data is the same as the manner in which the microcontroller module 102 in the biometric identification unit 10 adjusts the associated data in the storage module 103 according to the another piece of associated data.

Accordingly, when the another piece of associated data generated by the microcontroller module 502 is simply stored in the storage module 505, because original associated data in the storage module 103 of the biometric identification unit 10 and the another piece of associated data generated by the microcontroller module 502 are stored in the control unit 50, in addition to transmitting another piece of associated data generated later to the biometric identification unit 10, the microcontroller module 502 may also transmit the original associated data in the storage module 103 to the biometric identification unit 10 if necessary (for example, when the storage module 103 of the biometric identification unit 10 loses data due to physical damage or in other cases in which the original associated data needs to be recovered).

When the microcontroller module 502 of the control unit 50 may adjust original associated data in the storage module 505 according to the another piece of associated data generated by the microcontroller module 502, the data in the storage module 505 of the control unit 50 may be synchronously updated with the data in the storage module 103 of the biometric identification unit 10. For example, the microcontroller module 102 in the biometric identification unit 10 and the microcontroller module 502 in the control unit 50 both adjust the original associated data in the storage module 505 and in the storage module 103 respectively when receiving the another piece of associated data. In addition, the data synchronously updated may also be used as backup data for the storage module 103 in the biometric identification unit 10, so as to restore the adjusted associated data in the storage module 103 if necessary.

In addition, in some embodiments, the control unit 50 may be used as a double acknowledgment unit of the biometric identification unit 10. For example, after receiving the first biometric data, in addition to obtaining encoded data according to the first biometric data and the associated data (either the original associated data or the adjusted associated data) in the storage module 103, the microcontroller module 102 in the biometric identification unit 10 also transmits the first biometric data (or biometric processing data based on the first biometric data, depending on which of the associated data is used) to the microcontroller module 502 of the control unit 50, and the microcontroller module 502 obtains another piece of encoded data according to the first biometric data (or the biometric processing data based on the first biometric data) transmitted to the control unit 50 and the associated data stored in the storage module 505 (either the original associated data or the adjusted associated data, as long as the associated data is the same as that in the storage module 103). The microcontroller module 502 then transmits the another piece of encoded data back to the microcontroller module 102 of the biometric identification unit 10, and the microcontroller module 102 may compare whether the encoded data generated by the microcontroller module 102 is consistent with the another piece of encoded data received from the control unit 50. When the encoded data generated by the microcontroller module 102 is consistent with the another piece of encoded data received from the control unit 50, the microcontroller module 102 transmits the encoded data to the NFC signal transmission unit 20. Accordingly, the control unit 50 may be used as a double acknowledgment unit of the biometric identification unit 10 to prevent the biometric identification unit 10 from transmitting, for example, incorrect encoded data generated due to an emergency.

Figure 7:
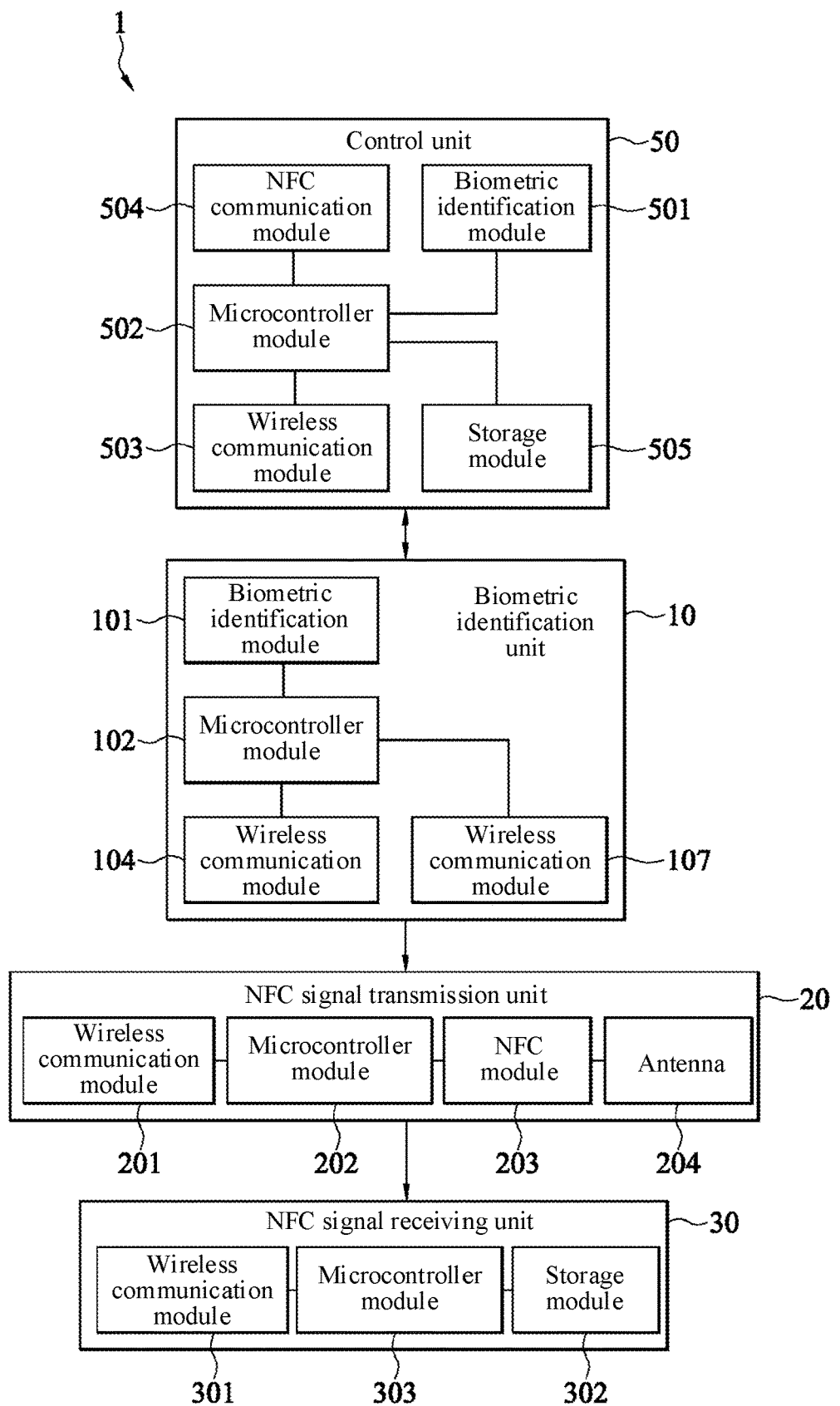
FIG. 7 is a schematic block diagram of an authority control system according to some embodiments of this application.

Next, refer to FIG. 7. In some embodiments, when the control unit 50 of the authority control system 1 includes the storage module 505, the biometric identification unit 10 may not need to include the storage module 103, and the microcontroller module 102 may still obtain the encoded data. For example, after the biometric identification module 101 in the biometric identification unit 10 obtains first biometric data, the microcontroller module 102 receives the first biometric data, and transmits the first biometric data (or biometric processing data based on the first biometric data) to the microcontroller module 502 of the control unit 50 through the wireless communication module 107. Because the storage module 505 of the control unit 50 includes associated data, after receiving the first biometric data (or the biometric processing data based on the first biometric data), the microcontroller module 502 may obtain encoded data according to the first biometric data (or the biometric processing data) and the associated data in the storage module 505. The microcontroller module 502 then transmits the encoded data to the microcontroller module 102 of the biometric identification unit 10. Accordingly, the control unit 50 is used as a unit for obtaining encoded data, and the microcontroller module 102 may still obtain the encoded data even if the biometric identification unit 10 does not include the storage module 103.

Figure 8:
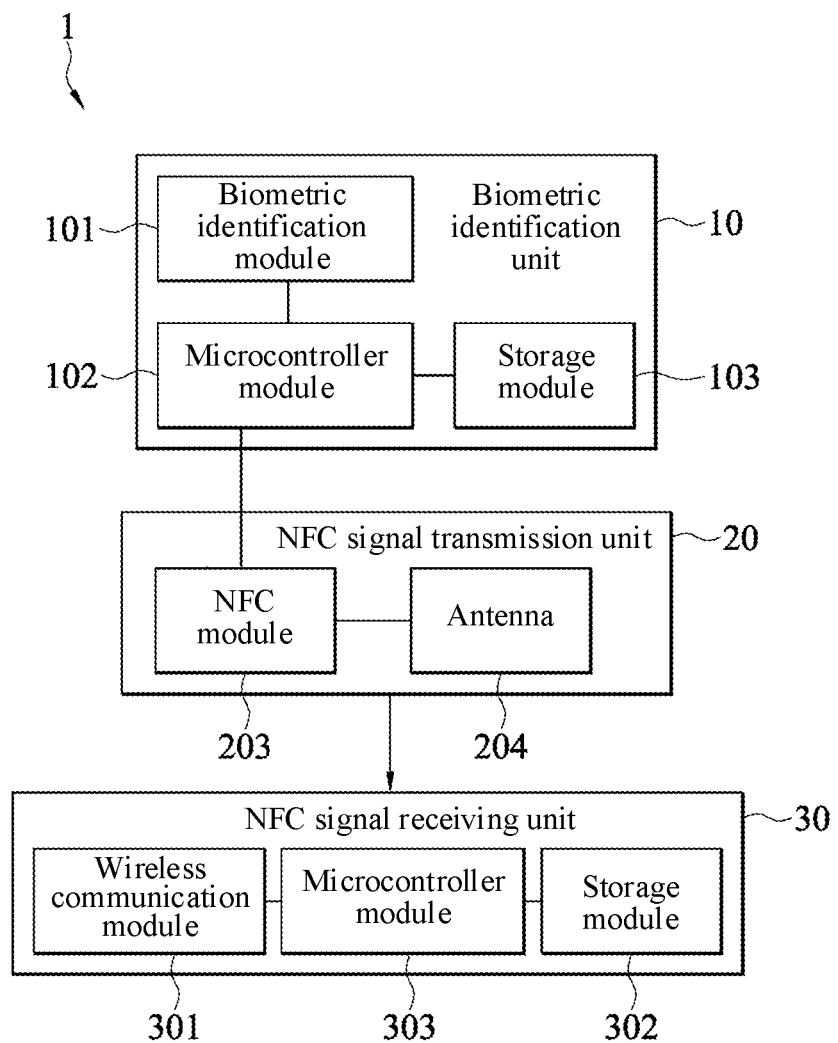
FIG. 8 is a schematic block diagram of an authority control system according to some embodiments of this application.

Next, refer to FIG. 8. In some embodiments, the microcontroller module 102 of the biometric identification unit 10 may be connected to the NFC module 203 of the NFC signal transmission unit 20 in a wired manner. In these embodiments, the microcontroller module 102 includes the functions of the microcontroller module 202 originally existing in the NFC signal transmission unit 20. For example, the microcontroller module 102 includes the functions for transmitting the encoded data to the NFC module 203 and controlling the NFC module 203 to transmit the encoded data to the NFC signal receiving unit 30 through the antenna 204 by means of NFC transmission.

Figure 9:
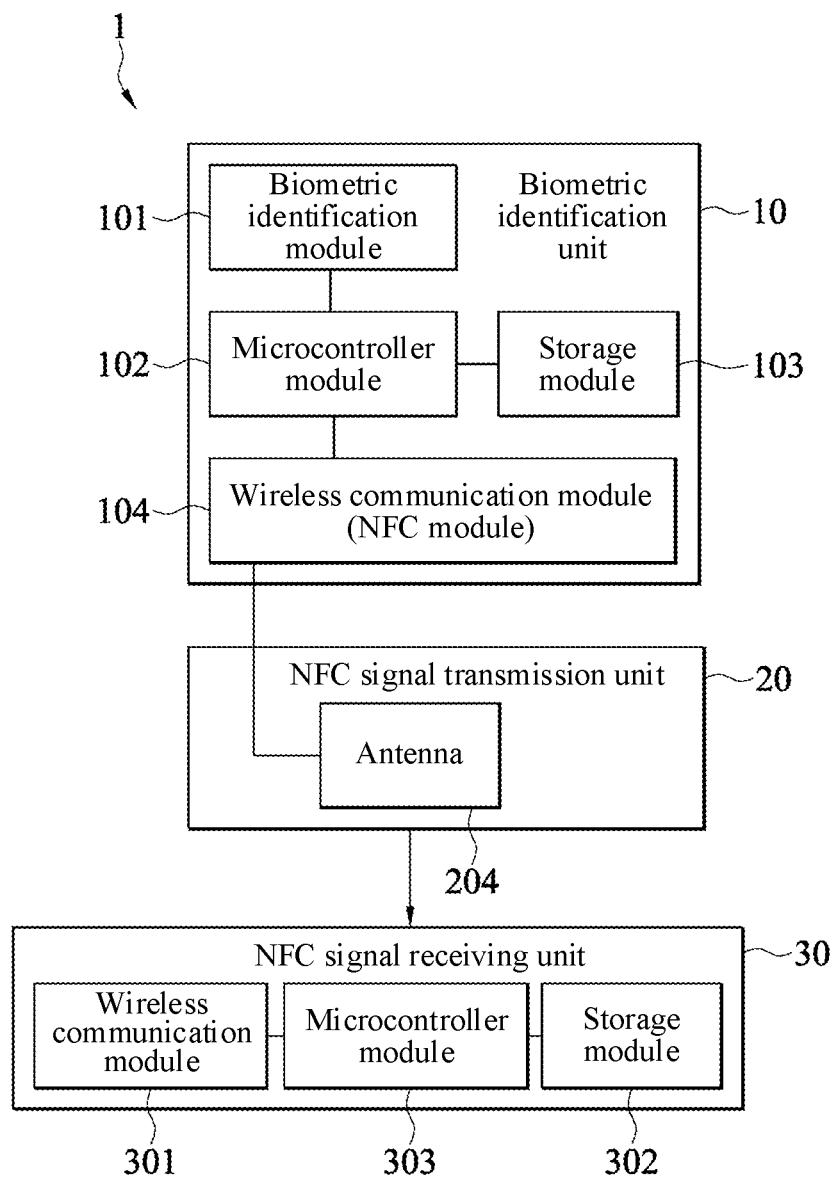
FIG. 9 is a schematic block diagram of an authority control system according to some embodiments of this application.

Next, refer to FIG. 9. In some embodiments, when the wireless communication module 104 in the biometric identification unit 10 is an NFC module, the NFC module may be connected to the antenna 204 in the NFC signal transmission unit 20 in a wired manner. The microcontroller module 102 in the biometric identification unit 10 includes some of the functions of the microcontroller module 202 originally existing in the NFC signal transmission unit 20, for transmitting the encoded data to the NFC module and controlling the NFC module to transmit the encoded data to the NFC signal receiving unit 30 through the antenna 204 by means of NFC transmission.

Based on the above, the biometric identification unit 10 in the authority control system 1 of this disclosure may obtain, according to biometric features of a user, encoded data (for example, an access control card number) stored in a physical authority identification device (for example, a physical access control card) readable to an original NFC device, and then transmit the encoded data to the NFC signal receiving unit 30 through the NFC signal transmission unit 20. Then the NFC signal receiving unit 30 determines an authorization type according to the encoded data. Accordingly, the NFC device is extended into an authority control system capable of performing biometric identification, without the need to use a device such as a physical access control card to be sensed by the NFC device.

Besides, the authority control system 1 further includes a to-be-unlocked unit 40 connected to the NFC signal receiving unit 30, and the NFC signal receiving unit 30 may transmit, according to the authorization type, corresponding information/instructions to the to-be-unlocked unit 40, so as to make the to-be-unlocked unit 40 produce a corresponding action. Therefore, the authority control system 1 of this application may also be used as an access control system.

In addition, the authority control system 1 may further include a control unit 50 capable of wirelessly communicating with the biometric identification unit 10. Through the control unit 50, stored data in the biometric identification unit 10 can be remotely adjusted to add, modify, overwrite, or delete the stored data, so that the authority control system 1 can make adjustment such as adding authorized personnel according to a situation, or the control unit 50 may be used as a data determining or auxiliary determining unit of the biometric identification unit 10 to increase setting flexibility or security of the authority control system 1.

What is claimed is:

1. An authority control system configured to access a control card, the authority control system comprising:
   a biometric identification unit, configured to generate encoded data, the control card includes a control card number corresponding to the encoded data, the biometric identification unit comprising:
      a first biometric identification module, configured to obtain first biometric data;
      a first storage module, storing associated data; and
      a first microcontroller module, connected to the first biometric identification module and the first storage module, the first microcontroller module being configured to
         receive the first biometric data;
         obtain the encoded data according to the first biometric data and the associated data; and
         transmit the encoded data;
   a near field communication (NFC) signal transmission unit, configured to receive the encoded data transmitted by the biometric identification unit, the NFC signal transmission unit comprising an antenna, and the NFC signal transmission unit being configured to transmit the encoded data through the antenna; and
   an NFC signal receiving unit, the NFC signal receiving unit comprising:
      a first wireless communication module, configured to receive the encoded data transmitted by the NFC signal transmission unit and configured to access the control card to obtain the encoded data;
      a second storage module, storing authorization type comparison data; and
      a second microcontroller module, connected to the first wireless communication module and the second storage module, and configured to
         receive the encoded data received by the first wireless communication module; and
         determine an authorization type according to the encoded data and the authorization type comparison data.

2. The authority control system according to claim 1, wherein the first microcontroller module is configured to
   receive the first biometric data;
   process the first biometric data to obtain biometric processing data;
   obtain the encoded data according to the biometric processing data and the associated data; and
   transmit the encoded data.

3. The authority control system according to claim 1, wherein the biometric identification unit further comprises an input module and a display module, the input module and the display module being connected to the first microcontroller module respectively.

4. The authority control system according to claim 1, further comprising a to-be-unlocked unit, the to-be-unlocked unit comprising a to-be-unlocked item, wherein
   the NFC signal receiving unit is configured to
      transmit the authorization type to the to-be-unlocked unit; and
   the to-be-unlocked unit is configured to
      receive the authorization type transmitted by the NFC signal receiving unit; and
      perform a corresponding action on the to-be-unlocked item according to the authorization type.

5. The authority control system according to claim 4, wherein the to-be-unlocked unit further comprises a third microcontroller module, the third microcontroller module being connected to the to-be-unlocked item, wherein the third microcontroller module is configured to
   receive the authorization type transmitted by the NFC signal receiving unit, the authorization type comprising a corresponding action instruction; and
   perform the corresponding action on the to-be-unlocked item according to the corresponding action instruction.

6. The authority control system according to claim 4, wherein the to-be-unlocked unit further comprises:
   a third storage module, storing authorization action comparison data; and
   a third microcontroller module, the third storage module and the to-be-unlocked item being connected to the third microcontroller module respectively, wherein
   the third microcontroller module is configured to
      receive the authorization type transmitted by the NFC signal receiving unit; and
      perform the corresponding action on the to-be-unlocked item according to the authorization type and the authorization action comparison data.

7. The authority control system according to claim 1, wherein the NFC signal transmission unit comprises an NFC module, the NFC module being connected to the antenna, and the first microcontroller module is connected to the NFC module, wherein the first microcontroller module is configured to receive the first biometric data;
   obtain the encoded data according to the first biometric data and the associated data;
   transmit the encoded data to the NFC module; and
   control the NFC module to transmit the encoded data through the antenna.

8. The authority control system according to claim 1, wherein the biometric identification unit comprises a second wireless communication module, the first microcontroller module is connected to the second wireless communication module, and the first microcontroller module is configured to transmit the encoded data to the NFC signal transmission unit through the second wireless communication module.

9. The authority control system according to claim 8, wherein the NFC signal transmission unit comprises:
   an NFC module, the NFC module being connected to the antenna;
   a fourth microcontroller module, the fourth microcontroller module being connected to the NFC module; and
   a third wireless communication module, the third wireless communication module being connected to the fourth microcontroller module, and the third wireless communication module being configured to establish communication with the second wireless communication module, and receive the encoded data transmitted by the biometric identification unit; and the fourth microcontroller module being configured to transmit the encoded data received by the third wireless communication module to the NFC module, and control the NFC module to transmit the encoded data through the antenna.

10. The authority control system according to claim 9, wherein the second wireless communication module and the third wireless communication module are Bluetooth Low Energy (BLE) wireless modules.

11. The authority control system according to claim 8, wherein the biometric identification unit further comprises a fourth wireless communication module, the fourth wireless communication module being connected to the first microcontroller module; and
the authority control system further comprises a control unit, configured to adjust the associated data in the first storage module, the control unit comprising:
a second biometric identification module, configured to obtain second biometric data;
a fifth microcontroller module, the fifth microcontroller module being connected to the second biometric identification module; and
a fifth wireless communication module, the fifth wireless communication module being connected to the fifth microcontroller module, and the fifth wireless communication module being configured to establish communication with the fourth wireless communication module,
wherein the fifth microcontroller module is configured to receive the second biometric data;
generate another piece of associated data according to the second biometric data; and
transmit the another piece of associated data to the biometric identification unit through the fifth wireless communication module;
wherein the first microcontroller module is configured to receive the another piece of associated data through the fourth wireless communication module; and
adjust the associated data in the first storage module according to the another piece of associated data.

12. The authority control system according to claim 11, wherein the fifth wireless communication module and the fourth wireless communication module are wireless fidelity (Wi-Fi) wireless modules.

13. The authority control system according to claim 11, wherein the adjusting the associated data in the first storage module comprises: adding, modifying, overwriting, or deleting the associated data in the first storage module.

14. The authority control system according to claim 11, wherein the control unit further comprises an NFC communication module, the NFC communication module being connected to the fifth microcontroller module, and the NFC communication module being configured to obtain another piece of encoded data,
wherein the fifth microcontroller module is configured to receive the second biometric data and the another piece of encoded data;
generate the another piece of associated data according to the second biometric data and the another piece of encoded data; and
transmit the another piece of associated data to the biometric identification unit through the fifth wireless communication module.

15. The authority control system according to claim 11, wherein the control unit further comprises a fourth storage module, the fourth storage module being connected to the fifth microcontroller module, and the fourth storage module being configured to store the another piece of associated data generated by the fifth microcontroller module.

16. The authority control system according to claim 15, wherein the fifth microcontroller module is configured to transmit the another piece of associated data stored in the fourth storage module to the biometric identification unit.

17. The authority control system according to claim 11, wherein the control unit further comprises a fourth storage module, the fourth storage module storing the associated data and being configured to store the another piece of associated data generated by the fifth microcontroller module.

18. The authority control system according to claim 17, wherein the fifth microcontroller module is configured to transmit the another piece of associated data stored in the fourth storage module to the biometric identification unit.

19. The authority control system according to claim 11, wherein the control unit further comprises a fourth storage module, the fourth storage module storing the associated data, and the fifth microcontroller module is configured to adjust the associated data in the fourth storage module according to the another piece of associated data, wherein the fifth microcontroller module adjusts the associated data in the fourth storage module in a manner the same as the manner in which the first microcontroller module adjusts the associated data in the first storage module.

20. The authority control system according to claim 19, wherein the first microcontroller module in the first biometric identification unit is configured to
receive the first biometric data;
transmit the first biometric data or biometric processing data based on the first biometric data to the control unit; and
obtain the encoded data according to the first biometric data and the associated data in the first storage module;
the fifth microcontroller module in the control unit is configured to
obtain another piece of encoded data according to the first biometric data or the biometric processing data transmitted to the control unit and the associated data stored in the fourth storage module; and
transmit the another piece of encoded data back to the biometric identification unit; and
the first microcontroller module is further configured to
compare whether the encoded data is consistent with the another piece of encoded data; and
when the encoded data is consistent with the another piece of encoded data, transmit the encoded data to the NFC signal transmission unit.

21. An authority control system configured to access a control card, the authority control system comprising:
a biometric identification unit, storing associated data, the control card includes a control card number corresponding to the encoded data, the biometric identification unit being configured to
obtain first biometric data;
obtain encoded data according to the first biometric data and the associated data; and
transmit the encoded data; and
a near field communication (NFC) signal transmission unit, configured to
receive the encoded data transmitted by the biometric identification unit; and
transmit the encoded data by using an NFC transmission technology; and
an NFC signal receiving unit, the NFC signal receiving unit storing authorization type comparison data, and the NFC signal receiving unit being configured to
receive the encoded data transmitted by the NFC signal transmission unit;
access the control card to obtain the encoded data; and determine an authorization type according to the encoded data and the authorization type comparison data.

22. The authority control system according to claim 21, further comprising a to-be-unlocked unit, the to-be-unlocked unit comprising a to-be-unlocked item, wherein the to-be-unlocked unit is configured to
  receive the authorization type; and
  perform a corresponding action on the to-be-unlocked item according to the authorization type.

23. The authority control system according to claim 21, further comprising a control unit, configured to
  obtain second biometric data; and
  generate another piece of associated data according to the second biometric data; and
  the biometric identification unit being configured to
  receive the another piece of associated data; and
  adjust the associated data in the biometric identification unit according to the another piece of associated data.

* * * * *